United States Patent
Chung et al.

(10) Patent No.: US 11,082,368 B2
(45) Date of Patent: Aug. 3, 2021

(54) SEMI-AUTOMATIC COMMUNICATION USING CHATBOT AND CONSULTANT DEVICE

(71) Applicant: KAKAO CORP., Jeju-si (KR)

(72) Inventors: Ui Chung Chung, Seoul (KR); No Suk Myung, Yongin-si (KR); Ji Soo Hwang, Yongin-si (KR)

(73) Assignee: KAKAO CORP., Jeju-si (KR)

( * ) Notice: Subject to any disclaimer, the term of this patent is extended or adjusted under 35 U.S.C. 154(b) by 176 days.

(21) Appl. No.: 16/233,307

(22) Filed: Dec. 27, 2018

(65) Prior Publication Data

US 2019/0207877 A1   Jul. 4, 2019

(30) Foreign Application Priority Data

Dec. 28, 2017   (KR) .......................... 10-2017-0183148

(51) Int. Cl.
*G06F 15/16* (2006.01)
*H04L 12/58* (2006.01)
*G06N 20/00* (2019.01)

(52) U.S. Cl.
CPC ............ *H04L 51/02* (2013.01); *H04L 51/046* (2013.01); *H04L 51/30* (2013.01); *G06N 20/00* (2019.01)

(58) Field of Classification Search
CPC ....... H04L 51/02; H04L 51/046; H04L 51/30; G06N 20/00
See application file for complete search history.

(56) References Cited

U.S. PATENT DOCUMENTS

| | | | |
|---|---|---|---|
| 8,250,192 B2 * | 8/2012 | Bowerman | G06F 15/173 709/223 |
| 8,767,948 B1 * | 7/2014 | Riahi | H04M 3/5235 379/266.08 |
| 9,137,184 B2 * | 9/2015 | Kulkarni | H04M 3/28 |
| 9,386,113 B1 * | 7/2016 | Goncharuk | H04L 51/32 |
| 9,559,993 B2 * | 1/2017 | Palakovich | H04L 51/04 |
| 10,958,600 B1 * | 3/2021 | Annadata | H04L 51/02 |
| 2011/0289076 A1 * | 11/2011 | Boyle | G06F 16/3329 707/723 |
| 2012/0041903 A1 * | 2/2012 | Beilby | G06N 20/00 706/11 |

(Continued)

FOREIGN PATENT DOCUMENTS

JP     2002132291 A    5/2002
KR   1020170036422 A   4/2007

(Continued)

*Primary Examiner* — Razu A Miah
(74) *Attorney, Agent, or Firm* — Hamre, Schumann, Mueller & Larson, P.C.

(57) ABSTRACT

A method for providing semi-automatic communication using a chatbot and a consultant device includes receiving, from a messenger server, a message input to an instant messaging application of a user device; determining a reliability for an automatic answer message made by the chatbot to answer the message; and transmitting the automatic answer message to the user device through the messenger server if the reliability is determined higher than a predetermined level, or enabling the consultant device to transmit a manual answer to the message if the reliability is determined lower than the predetermined level. The reliability is calculated based on a result of analysis for the message.

18 Claims, 4 Drawing Sheets

(56) References Cited

U.S. PATENT DOCUMENTS

| | | | | |
|---|---|---|---|---|
| 2014/0108583 A1* | 4/2014 | Kulkarni | ............ | H04M 3/5191 |
| | | | | 709/206 |
| 2014/0122056 A1* | 5/2014 | Duan | ...................... | H04L 51/02 |
| | | | | 704/9 |
| 2014/0122407 A1* | 5/2014 | Duan | ....................... | G06N 5/02 |
| | | | | 706/50 |
| 2014/0236934 A1* | 8/2014 | Boyle | ............... | G06F 16/24578 |
| | | | | 707/723 |
| 2016/0099892 A1* | 4/2016 | Palakovich | ............. | H04L 51/02 |
| | | | | 709/206 |
| 2016/0308799 A1* | 10/2016 | Schubert | ................. | H04L 51/02 |
| 2016/0351206 A1* | 12/2016 | Gelfenbeyn | ............ | G10L 15/26 |
| 2017/0344532 A1* | 11/2017 | Zhou | ....................... | G06F 40/56 |
| 2018/0232741 A1* | 8/2018 | Jadhav | ................. | G06Q 30/016 |

FOREIGN PATENT DOCUMENTS

| | | | |
|---|---|---|---|
| KR | 1020080075748 A | 8/2008 | |
| KR | 101605430 B1 | 3/2016 | |
| KR | 20170118983 A | 10/2017 | |
| KR | 1020170137419 A | 12/2017 | |

* cited by examiner

SEMI-AUTOMATIC COMMUNICATION USING CHATBOT AND CONSULTANT DEVICE

CROSS-REFERENCE TO RELATED APPLICATION

This application claims the benefit under 35 USC 119(a) of Korean Patent Application No. 10-2017-0183148 filed on Dec. 28, 2017, in the Korean Intellectual Property Office, the entire disclosures of which are incorporated herein by reference for all purposes.

TECHNICAL FIELD

The present disclosure relates to technologies for providing semi-automatic communication using a chatbot and a consultant device.

BACKGROUND

An IMS (Instant Messaging Service) is a real-time online communication service that enables a message transmitted by a sender to immediately appear on the screen of a recipient's device without using an e-mail program or a web browser. Particularly, a service for providing chatting, voice call, and video call using a mobile network is referred to as an MIM (Mobile Instant Messenger) service.

In recent years, a chatbot or messenger bot which is a robot configured to simulate a chat like a human being has been applied to the IMS, and, thus, a company can automatically provide a customer with one-to-one customized information through a one-to-one chat between the company and the customer using the messenger.

In general, the chatbot or messenger bot can interpret a message input by a user and automatically create an answer message and then provide the answer message to the user.

However, if the chatbot or messenger bot receives input of a question to which it is impossible to mechanically respond, an inappropriate answer to the question may be provided.

SUMMARY

At least some of the embodiments described herein facilitate a method and a server for providing a semi-automatic communication using a chatbot and a consultant device in which if a consulting message is input by a user through an instant messaging application, the chatbot makes an answer first and any one of the chatbot and the consultant device is selected to provide an answer based on the reliability of the answer made by the chatbot and thus to suggest an answer with high accuracy and improved efficiency. At least one of the embodiments described herein facilitate a method and a server for providing a semi-automatic communication using a chatbot and a consultant device in which if an answer is provided by the consultant device, a consulting message input by a user and the answer message input by the consultant device are matched and stored and then used for machine learning, and, thus, even if a new message is received later from the user, the chatbot can automatically provide an answer message using the matched and stored answer message of the consultant device. However, problems to be solved by the present disclosure are not limited to the above-described problems. There may be other problems to be solved by the present disclosure.

At least some of the embodiments described herein pertain to a method for providing semi-automatic communication using a chatbot and a consultant device that includes; receiving, from a messenger server, a message input to an instant messaging application of a user device; determining a reliability for an automatic answer message made by the chatbot to answer the message; and transmitting the automatic answer message to the user device through the messenger server if the reliability is determined higher than a predetermined level, or enabling the consultant device to transmit a manual answer to the message if the reliability is determined lower than the predetermined level. The reliability is calculated based on a result of analysis for the message.

At least one of the embodiments described herein pertains to a semi-automatic communication providing server using a chatbot and a consultant device that includes: a message receiving unit that receives, from a messenger server, a message input to an instant messaging application of a user device; a reliability determination unit that determines a reliability for an automatic answer message made by the chatbot to answer the message; and an answer providing unit that transmits the automatic answer message to the user device through the messenger server if the reliability is determined higher than a predetermined level, or enables a consultant device to transmit a manual answer to the message if the reliability is determined lower than the predetermined level. The reliability is calculated based on a result of analysis for the message.

The above-described first and second aspects are provided by way of illustration only and should not be construed as liming the present disclosure. Besides the above-described embodiments, there may be additional embodiments described in the accompanying drawings and the detailed description.

According to any one of the embodiments described above, it is possible to provide a method and a server for providing a semi-automatic communication using a chatbot and a consultant device in which if a consulting message is input by a user through an instant messaging application, the chatbot makes an answer first and any one of the chatbot and the consultant device is selected to provide an answer based on the reliability of the answer made by the chatbot and thus to suggest an answer with high accuracy and improved efficiency. It is possible to provide a method and a server for providing a semi-automatic communication using a chatbot and a consultant device in which if an answer is provided by the consultant, a consulting message input by a user and the answer message input by the consultant device are matched and stored and then used for machine learning, and, thus, even if a new message is received later from the user, the chatbot can automatically provide an answer message using the matched and stored answer message of the consultant device.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
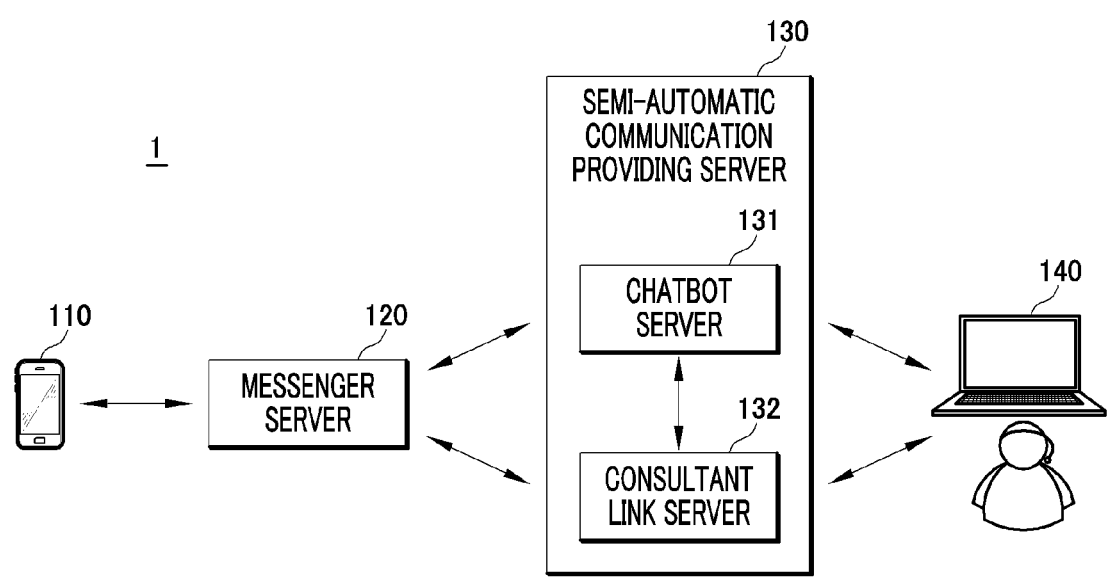
FIG. 1 is an illustration of an example of a semi-automatic communication providing system in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

FIG. 1 is an illustration of an example of a semi-automatic communication providing system in accordance with an embodiment of the present disclosure. Referring to FIG. 1, a semi-automatic communication providing system 1 may include a user device 110, a messenger server 120, a semi-automatic communication providing server 130, and a consultant device 140. The semi-automatic communication providing system 1 illustrated in FIG. 1 is just an embodiment of the present disclosure and should not be construed as liming the present disclosure. That is, the semi-automatic communication providing system 1 can be configured differently from that shown in FIG. 1 according to various embodiments of the present disclosure.

The user device 110 may register friends including real friends and virtual friends through an instant messaging application installed in the user device 110. For example, the user device 110 may register another user without a profit-making purpose (e.g., family, acquaintances, coworkers, etc.) as a real friend through the instant messaging application. The user device 110 may provide a user with an instant messaging service that enables the user to exchange chats with the other user registered as a real friend in a chat room through the instant messaging application.

Further, the user device 110 may register an official account corresponding to a specific service as a virtual friend through the instant messaging application. The official account may refer to an account that is managed by a specific company to provide the specific service. For example, the official account may provide information about the specific service to the user device 110 through a chat room established for the official account and the user device 110.

The user device 110 may register the official account as a virtual friend and receive the information about the specific service from the official account. Even if the user device 110 does not register the official account as a virtual friend, the user device 110 may also receive the information about the specific service.

The official account may use a chatbot to provide the user device 110 with the information about the specific service provided by the specific company. A manager of the official account may create the chatbot through a user interface for bot builder provided by the messenger server 120 and link the created chatbot to the official account to provide the information about the specific service (for example, an answer to a question message relevant to the specific service). Further, the manager of the official account may manage the official account matched with a chatbot one to one through the user interface for bot builder or extend and link the official account to multiple chatbots.

Further, the user device 110 may register a chatbot corresponding to the specific service as a virtual friend through the instant messaging application. For example, the chatbot registered as a virtual friend may provide the user device 110 with information about a weather service, a stock service, a traffic service, a shopping service, consulting, and the like.

Therefore, if the user device 110 registers an official account as a virtual friend, the user device 110 may be provided with an answer to a question message through a chatbot linked to the official account, and if the user device 110 registers a chatbot as a virtual friend, the user device 110 may be provided with an answer to a question message through the chatbot.

The user device 110 may receive input of a consulting message through the instant messaging application and transmit the input consulting message to the semi-automatic communication providing server 130 through the messenger server 120. For example, the user device 110 may add an official account linked to a chatbot as a friend in the instant messaging application and transmit a message through a chat room including the official account to receive a consulting service. Otherwise, the user device 110 may transmit a message to request a direct chat with a consultant device through the chat room including the official account to the semi-automatic communication providing server 130.

The user device 110 may receive an answer message from the semi-automatic communication providing server 130 through the instant messaging application and display the received answer message through the chat room for the official account. For example, the user device 110 may receive an automatic answer message searched by the semi-automatic communication providing server 130 through the messenger server 120 and display the automatic answer message through the chat room for the official account with the chatbot. In this case, the user device 110 may also display an identification mark (e.g., a chatbot icon) indicating that the automatic answer message has been created by the chatbot. Otherwise, the user device 110 may receive a manual answer written by the consultant from the consultant device 140 through the messenger server 120 and display the manual answer. In this case, the user device 110 may also display an identification mark (e.g., a consultant icon) indicating that the manual answer of the consultant device 140 has been created by the consultant device 140.

The user device 110 may be configured including a memory in which a program (or application) for providing an instant messaging service is stored and a processor configured to execute the program. Herein, the processor may perform various functions upon execution of the program stored in the memory.

The messenger server 120 may provide an instant messaging service that enables the user device 110 to exchange chats with another user registered as a real friend in a chat room. Further, the messenger server 120 may provide an instant messaging service that enables the user device 110 to exchange chats with a chatbot or official account registered as a virtual friend at an messenger app.

For example, if the messenger server 120 receives a consulting request message relevant to a selected service from the user device 110, the messenger server 120 may transfer a received chatbot ID and the consulting request message to the semi-automatic communication providing server 130. Further, if the messenger server 120 receives an official account ID and a consulting request message relevant to a selected service from the user device 110, the messenger server 120 may transfer the received official account ID (or a chatbot ID mapped to the received official account ID) and the received consulting request message to the semi-automatic communication providing server 130.

The messenger server 120 may receive an answer message from the semi-automatic communication providing server 130. For example, the messenger server 120 may receive an automatic answer message searched by the chatbot from the semi-automatic communication providing server 130. For another example, the messenger server 120 may receive a manual answer written by the consultant device 140 from the semi-automatic communication providing server 130. The messenger server 120 may transmit the received automatic answer message to a chat room established for the user of the user device 110 and the chatbot or a chat room established for the user of the user device 110 and the official account. The semi-automatic communication providing server 130 may include a chatbot server 131 and a consultant link server 132.

Herein, the chatbot server 131 may function to search an automatic answer message corresponding to a message of the user device 110 through the chatbot and provide the searched automatic answer message to the user device 110 through the messenger server 120.

The consultant link server 132 may function to assign a consultant device to any one of multiple consultant devices 140 of a specific official account through a server (e.g., a movie server, a shopping mall server, etc.) provided by the official account and if an answer corresponding to a message of the user device 110 is created by the assigned consultant device 140, the consultant link server 132 may function to transfer the created answer to the user device 110 through the messenger server 120. A consultant device may be assigned, for example, according to the order or by applying priority to a consultant device who has not consulted, or a consultant device may directly select consulting via a consulting request list. Further, the consultant link server 132 may be present outside the semi-automatic communication providing server.

According to an embodiment, the chatbot server 131 may lead semi-automatic communication. In an embodiment, the chatbot server 131 may search an automatic answer message to a message of the user device 110 and determine the reliability for the searched automatic answer message to progress semi-automatic communication. Hereinafter, the configuration for semi-automatic communication led by the chatbot server 131 will be described.

The chatbot server 131 may receive a consulting message input using the instant messaging application by the user device 110 through the messenger server 120. For example, the chatbot server 131 may receive a message or two or more consecutive messages from the user device 110.

Otherwise, if the chatbot server 131 receives a request for direct chat with a consultant device 140 from the user device 110, the chatbot server 131 may forward the message input by the user device 110 to the consultant link server 132 and transfer the message to the consultant device 140 assigned by the consultant link server 132.

The chatbot server 131 may determine the reliability for an automatic answer message made by the chatbot to answer the message of the user device 110 based on the result of analysis for the message of the user device 110.

For example, the reliability is calculated by comparing a pre-registered message previously stored in the chatbot server 131 with the message of the user device 110 and may be, for example, a score based on a concordance rate according to the result of comparison between the text of the pre-registered message and the text of the message of the user device 110. For example, if the chatbot server 131 receives a message from the user device 110, the chatbot server 131 may determine the reliability by comparing the message with the pre-registered message. For another example, the chatbot server 131 receives a message including two or more consecutive messages (e.g., "I bought a bag on the date of XX/XX", "I'd like to get a refund") from the user device 110, the chatbot server 131 may connect the two or more consecutive messages determine an intent (i.e., the intent of the message, e.g., "Purchased items can be refunded within 7 days of purchase. The purchased bag can be purchased by the date of XX/XX.") and determine the reliability by comparing the extracted intent with the pre-registered message.

For another example, the reliability may be calculated based on the similarity (or concordance rate) between a predetermined reference message which is the reference of an answer to the message input by the user device 110 and an answer message searched by the chatbot server 131.

For yet another example, the reliability may be calculated by vectorizing input data of the user device 110 and the context of the user. The reliability can be represented in vector form such as [1, 0, 1, 1, 0, . . . , . . . ]. For example, if the input data of the user device 110 are used for the reliability, elements of a word and a sentence can be represented in vector form through natural language processing. Otherwise, if the context of the user is used for the reliability, contextual information different for each user (e.g., a previous execution block, current context parameters, etc.) can be represented in vector form. Herein, the reliability can be represented in vector form for each of the input data of the user device 110 or the context of the user, or can be represented in vector form for a combination of the input data of the user device 110 and the context of the user.

A vector may be represented when a message is input by the user device 110. To this end, the chatbot server 131 has a model to evaluate input of the user and can evaluate the reliability of input of the user through the user input evaluation model. The user input evaluation model is created based on, for example, the user's answer to the case where the user's input is provided by a chatbot and the user's answer to the case where the answer is provided by the consultant device 140, and if the chatbot server 131 receives the user's input, the chatbot server 131 converts the user's input into a vector and then measures the similarity by using the user input evaluation model to score. In this case, the user's answer to the case where the user's input is provided by the chatbot may evaluate an automatic answer message to be provided later by the chatbot in the consultant device 140.

If the chatbot server 131 determines that the reliability is higher than a predetermined level, the chatbot server 131 may transmit an automatic answer message to the user device 110 through the messenger server 120. For example, if the chatbot server 131 determines that the reliability is higher than the predetermined level, the chatbot server 131 may search an automatic answer message stored as matched with a pre-registered message and after the searched automatic answer message is transmitted to the user device 110 through the messenger server 120, the chatbot server 131 may enable information about chats between the user device 110 and the chatbot until the automatic answer message is transmitted to be provided to the consultant device 140 through the consultant link server 132. In this case, the automatic answer message provided to the user device 110 when the reliability is determined higher than the predetermined level may include an identification mark (e.g., a chatbot icon) indicating that the message has been created by the chatbot.

If the chatbot server 131 receives feedback indicating that the satisfaction with the automatic answer message is low from the user device 110, the chatbot server 131 may make a request for an answer to the consultant device 140 through the consultant link server 132.

The chatbot server 131 may store chat information between the consultant device 140 and the user device 110 to perform machine learning. For example, through machine learning, the chatbot server 131 may store multiple automatic answer messages matched with each pre-registered message and designate chat context weight information to each automatic answer message to provide different automatic answer messages for a same message depending on a chat context. The chat context with the user device 110 may include two or more pairs of a message of the user device 110 and an automatic answer message.

If the chatbot server 131 determines that the reliability is lower than the predetermined level, the chatbot server 131 may make a request for an answer to the consultant link server 132 of the official account in order for an answer to a message of the user device 110 to be provided through the consultant device 140 of the official account. For example, if the chatbot server 131 determines that the reliability is lower than the predetermined level, the chatbot server 131 may transmit a message of the user device 110 to the consultant link server 132. The consultant link server 132 may determine a consultant device to be assigned and transmit the message of the user device 110 to the determined consultant device 140. A manual answer input through the consultant device 140 that has received the message of the user device 110 may be transferred to the messenger server 120 through the consultant link server 132 or the semi-automatic communication providing server 130 or may be transferred directly to the messenger server 120. The messenger server 120 may transmit the received manual answer to the user device 110. The automatic answer message of the chatbot and the manual answer of the consultant device 140 transmitted to the user device 110 may be shown on a same chat room of the instant messaging application. In this case, the manual answer of the consultant device 140 provided to the user device 110 when the reliability is determined lower than the predetermined level may include an identification mark (e.g., a consultant icon) indicating that the message has been created by the consultant device 140.

If a manual answer input through the consultant device 140 is transmitted to the user device 110 through the messenger server 120, the chatbot server 131 may match and store the manual answer of the consultant device 140 with the message of the user device 110. Since the chatbot server 131 matches and stores the message of the user device 110 with the manual answer of the consultant device 140, if a new message is received later from the user device 110, the chatbot may create an automatic answer message using the stored manual answer of the consultant device 140. For example, the chatbot server 131 may perform machine learning with the matched and stored message and manual answer, respectively, to increase the number of messages of the user device 110 to which the chatbot is capable of creating an automatic answer message.

Machine learning may use various deep learning techniques such as Deep Neural Network (DNN), Convolutional Neural Network (CNN), Recurrent Neural Network (RNN), Restricted Boltzmann Machine (RBM), Deep Belief Network (DBN), Deep Q-Networks, and the like, but may not be limited thereto.

If the user device 110 is connected to the consultant device 140, the consultant link server 132 may enable a chat session between the user device 110 and the consultant device 140 to be maintained until receiving a consulting end message from the consultant device 140. After the user device 110 is connected to the consultant device 140, if the consultant link server 132 receives the consulting end message from the consultant device 140, the consultant link server 132 may terminate the chat session and the chatbot server 131 may redetermine the reliability for an automatic answer message made by the chatbot to answer a message of the user device 110.

According to another embodiment, the consultant link server 132 that is a server of an official account may lead semi-automatic communication instead of the chatbot server 131. In another embodiment, the consultant link server 132 may determine the reliability for an automatic answer message searched by the chatbot server 131 to progress semi-automatic communication depending on the result of determination of the reliability.

If the consultant link server 132 receives a message written by the user device 110 through the messenger server 120, the consultant link server 132 may transmit the received message to the chatbot server 131. Then, the consultant link server 132 may receive a searched automatic answer message from the chatbot server 131 and determine the reliability for the received automatic answer message.

If the automatic answer message has a high reliability, the consultant link server 132 may enable the automatic answer message to be transmitted to the user device 110 through the chatbot server 131 via the messenger server 120. However, if the automatic answer message has a low reliability, the consultant link server 132 may assign a consultant of the official account to provide a manual answer, and if a manual answer is created by the assigned consultant device 140, the consultant link server 132 may enable the created manual answer to be transferred to the user device 110 through the messenger server 120.

If the semi-automatic communication providing server 130 receives a consulting message from the user device 110, first, the chatbot server 131 may interpret the consulting message received from the user device 110 to create an automatic answer message and may transmit the created automatic answer message to the user device 110. Then, in a situation where an inappropriate answer can be made to a question which the chatbot cannot mechanically answer, the chatbot server 131 may allow the consultant device 140 to create a manual answer through the consultant link server 132 that is the server of the official account and transmit the created manual answer to the user device 110. Thus, it is possible to provide a consulting service with high accuracy and efficiency.

If the automatic answer message is transmitted to the user device 110 through the chatbot, the consultant device 140 may receive information about chats between the user device 110 and the chatbot until the automatic answer message is transmitted, through the consultant link server 132.

If the consultant device 140 receives a request for a direct chat with a consultant device 140 from the user device 110, the consultant device 140 is connected to the user device 110 through a chat session when the consultant link server 132 assigns a consultant device, and, thus, the consultant device 140 can be directly provided with the message input by the user device 110.

The consultant device 140 may receive a request for an answer to the message of the user device 110 from the consultant link server 132. To this end, the consultant device 140 may be connected to the user device 110 through a chat session, and the chat session may continue until the consultant device 140 receives a consulting end message from the consultant.

The consultant device 140 may receive a manual answer to the message of the user device 110 from the consultant and provide the manual answer through the same chat room of the official account for the automatic answer message of the chatbot. When a consulting with the user device 110 is ended, the consultant device 140 may receive a consulting end message from the consultant and transmit the consulting end message to the consultant link server 132.

Figure 2:
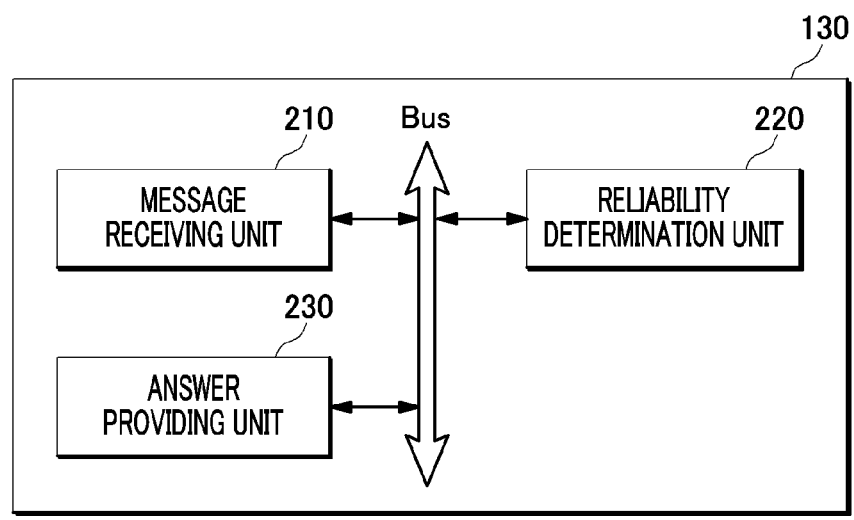
FIG. 2 is an illustration of an example of a semi-automatic communication providing server in accordance with various embodiments described herein.

FIG. 2 is an illustration of an example of a semi-automatic communication providing server in accordance with an embodiment of the present disclosure. Referring to FIG. 2, the semi-automatic communication providing server 130 may include a message receiving unit 210, a reliability determination unit 220, and an answer providing unit 230. If the chatbot server 131 and the consultant link server 132 of the official account are separately provided in the semi-automatic communication providing server 130, the chatbot server 131 may function as the semi-automatic communication providing server 130. Otherwise, the semi-automatic communication providing server 130 may be configured including both the chatbot server 131 and the consultant link server 132. Hereinafter, the semi-automatic communication providing server 130 including both the chatbot server 131 and the consultant link server 132 will be described.

The message receiving unit 210 may receive a message input by the user device 110 using the instant messaging application through the messenger server 120. For example, the message receiving unit 210 may receive a message to request a consulting or a message to request a direct chat with a consultant device 140 from the user device 110 through the messenger server 120. The message may include a message or two or more consecutive messages.

The reliability determination unit 220 may determine the reliability for an automatic answer message made by the chatbot to answer the message of the user device 110. For example, if the reliability determination unit 220 receives a message from the user device 110, the reliability determination unit 220 may determine the reliability by comparing the message with the pre-registered message. For another example, a message received from the user device 110 includes two or more consecutive messages, the reliability determination unit 220 may connect the two or more consecutive messages to determine the intent and determine the reliability by comparing the extracted intent with the pre-registered message.

The reliability may be calculated based on the result of analysis of the message of the user device 110.

For example, the reliability may be calculated by comparing a pre-registered message previously stored in the semi-automatic communication providing server 130 with the message of the user device 110. The reliability may be a score based on a concordance rate according to the result of comparison between the text of the pre-registered message and the text of the message of the user device 110 and can be represented as, for example, a value between 0 and 1. Low reliability may indicate that it is difficult for the chatbot to mechanically answer.

For another example, the reliability may be calculated based on the similarity (or concordance rate) between a reference message which is the reference of an answer to the message input by the user device 110 and an answer message searched by the semi-automatic communication providing server 130.

For yet another example, the reliability may be calculated by vectorizing input data of the user device 110 and the context of the user. The reliability can be represented in vector form such as [1, 0, 1, 1, 0, . . . , . . . ]. For example, if the input data of the user device 110 are used for the reliability, elements of a word and a sentence can be represented in vector form through natural language processing. Otherwise, if the context of the user is used for the reliability, contextual information different for each user (e.g., a previous execution block, current context parameters, etc.) can be represented in vector form. Herein, the reliability can be represented in vector form for each of the input data of the user device 110 or the context of the user, or can be represented in vector form for a combination of the input data of the user device 110 and the context of the user.

A vector may be represented when a message is input by the user device 110. To this end, the semi-automatic communication providing server 130 has a model to evaluate input of the user and can evaluate the reliability of input of the user through the user input evaluation model. The user input evaluation model is created based on, for example, the user's answer to the case where the user's input is provided by a chatbot and the user's answer to the case where the answer is provided by the consultant device 140, and if the semi-automatic communication providing server 130 receives the user's input, the semi-automatic communication providing server 130 converts the user's input into a vector and then measures the similarity by using the user input evaluation model to score. In this case, the user's answer to the case where the user's input is provided by the chatbot may evaluate an automatic answer message to be provided later by the chatbot in the consultant device 140.

After the user device 110 is connected to the consultant device 140, if the reliability determination unit 220 receives the consulting end message from the consultant device 140, the reliability determination unit 220 may redetermine the reliability for an automatic answer message made by the chatbot to answer a later message of the user device 110.

If the reliability is determined higher than a predetermined level, the answer providing unit 230 may create an automatic answer message and transmit the automatic answer message to the user device 110, and if the reliability is determined lower than the predetermined level, the answer providing unit 230 may request an answer to the message of the user device 110 to the consultant device 140. When the reliability is determined higher than the predetermined level, the automatic answer message provided to the user device 110 may include an identification mark (e.g., a chatbot icon) indicating that the message has been created by the chatbot. When the reliability is determined lower than the predetermined level, the manual answer of the consultant device 140 provided to the user device 110 may include an identification mark (e.g., a consultant icon) indicating that the message has been created by the consultant.

For example, if the reliability is determined higher than the predetermined level, the answer providing unit 230 may search an automatic answer message stored as matched with a pre-registered message. After the searched automatic answer message is transmitted to the user device 110, the answer providing unit 230 may provide information about chats between the user device 110 and the chatbot until the automatic answer message is transmitted, to the consultant device 140.

For another example, if the reliability is determined lower than the predetermined level, the answer providing unit 230 may provide the message of the user device 110 to the consultant device 140 and transfer a manual answer input by the consultant device 140 to the user device 110.

Figure 3:
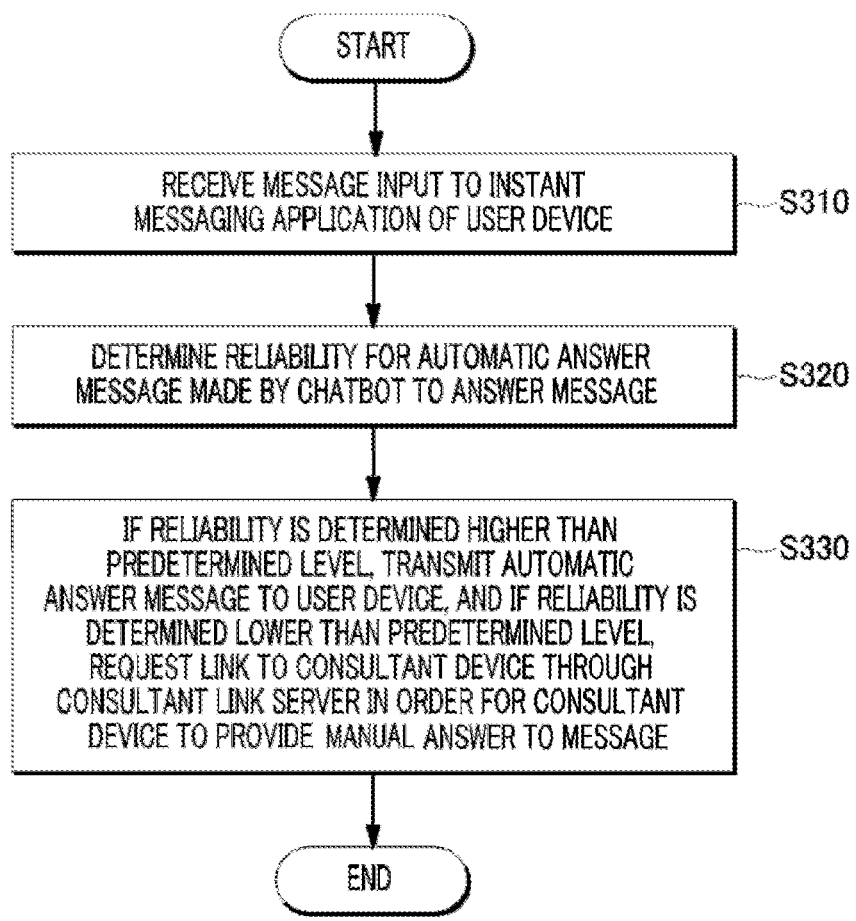
FIG. 3 is a flowchart illustrating an example processing flow for providing semi-automatic communication by a server using a chatbot and a consultant device in accordance with various embodiments described herein.

FIG. 3 is a flowchart illustrating an example processing flow for providing semi-automatic communication by a server using a chatbot and a consultant device in accordance with an embodiment of the present disclosure. The semi-automatic communication providing server 130 includes the chatbot server 131 and the consultant link server 132.

Hereinafter, a method for providing semi-automatic communication led by the chatbot server 131 will be described.

Referring to FIG. 3, in a process S310, the chatbot server 131 may receive a message input by the user device 110 using the instant messaging application through the messenger server 120. In this case, the chatbot server 131 may determine whether the message received from the user device 110 includes one message or two or more consecutive messages. For another example, if the chatbot server 131 receives a request for a direct chat with a consultant device 140 from the user device 110, the chatbot server 131 transmits the message input by the user device 110 to the consultant link server 132 and thus enables the input message to be transferred to the assigned consultant device 140 by the consultant link server 132.

In a process S320, the chatbot server 131 may determine the reliability for an automatic answer message made by the chatbot to answer the message of the user device 110.

For example, the reliability is calculated based on the result of analysis for the message of the user device 110 and may be, for example, a score based on a concordance rate according to the result of comparison between the text of the pre-registered message and the text of the message of the user device 110. Herein, for example, in the process S320, the message of the user device 110 received in the process S310 includes two or more consecutive messages, the chatbot server 131 may connect the two or more consecutive messages to determine an the intent and determine the reliability by comparing the extracted intent with the pre-registered message.

For another example, the reliability may be calculated based on the similarity (or concordance rate) between a reference message which is the reference of an answer to the message input by the user device 110 and an answer message searched by the chatbot server 131. For yet another example, the reliability may be calculated by vectorizing input data of the user device 110 and the context of the user. The reliability can be represented in vector form such as [1, 0, 1, 1, 0, ..., ...]. For example, if the input data of the user device 110 are used for the reliability, elements of a word and a sentence can be represented in vector form through natural language processing. Otherwise, if the context of the user is used for the reliability, contextual information different for each user (e.g., a previous execution block, current context parameters, etc.) can be represented in vector form. Herein, the reliability can be represented in vector form for each of the input data of the user device 110 or the context of the user, or can be represented in vector form for a combination of the input data of the user device 110 and the context of the user. A vector may be represented when a message is input by the user device 110.

In a process S330, if the reliability is determined higher than a predetermined level, the chatbot server 131 may transmit an automatic answer message to the user device 110, and if the reliability is determined lower than the predetermined level, the chatbot server 131 may request a link to the consultant device 140 through the consultant link server 132 in order for the consultant device 140 to provide a manual answer to the message of the user device 110. Herein, the automatic answer message provided to the user device 110 when the reliability is determined higher than the predetermined level may include an identification mark indicating that the automatic answer message has been created by the chatbot, and the manual answer of the consultant device 130 provided to the user device 110 when the reliability is determined lower than the predetermined level may include an identification mark indicating that the message has been created by the consultant device 140.

For example, in the process S330, if the reliability is determined higher than the predetermined level, the chatbot server 131 may search an automatic answer message stored as matched with a pre-registered message and provide chat information between the user device 110 and the chatbot to the consultant device 140 through the consultant link server 132 of the official account.

For another example, in the process S330, if the reliability is determined lower than the predetermined level, the chatbot server 131 may provide the message of the user device 110 to the consultant device 140 through the consultant link server 132 of the official account and transfer the manual answer input by the consultant device 140 to the user device 110. Herein, the automatic answer message of the chatbot and the manual answer of the consultant transmitted to the user device 110 may be shown on a same chat room of the instant messaging application.

To this end, if the user device 110 is connected to the consultant device 140, the consultant link server 132 can maintain a chat session between the user device 110 and the consultant device 140 until receiving a consulting end message from the consultant device 140.

Further, after the user device 110 is connected to the consultant device 140, if the consultant link server 132 receives the consulting end message from the consultant device 140, the consultant link server 132 may terminate the chat session and redetermine the reliability for an automatic answer message made by the chatbot to answer a later message of the user device 110.

Although not illustrated in FIG. 3, the chatbot server 131 may further perform matching and storing the message of the user device 110 with the manual answer of the consultant device 140.

Although not illustrated in FIG. 3, if a new message is received later from the user device 110, the chatbot server 131 may further perform enabling the chatbot to create an automatic answer message using the matched and stored manual answer of the consultant device 140. For example, the chatbot server 131 may perform machine learning with the matched and stored message and manual answer, respectively, to increase the number of messages of the user device 110 to which the chatbot is capable of creating an automatic answer message.

Although not illustrated in FIG. 3, if the chatbot server 131 receives feedback indicating that the satisfaction with the automatic answer message is low from the user device 110, the chatbot server 131 may further perform making a request for an answer to the consultant device 140 through the consultant link server 132 and storing chat information between the consultant device 140 and the user device 110 to perform machine learning. For example, through machine learning, the chatbot server 131 may store multiple automatic answer messages matched with each pre-registered message and designate chat context weight information to each automatic answer message to provide different automatic answer messages for a same message depending on a chat context. Herein, the chat context with the user device 110 may include two or more pairs of a message of the user device 110 and an automatic answer message.

In the descriptions above, the processes S310 to S330 may be divided into additional processes or combined into fewer processes depending on an embodiment. In addition, some of the processes may be omitted and the sequence of the processes may be changed if necessary.

Figure 4:
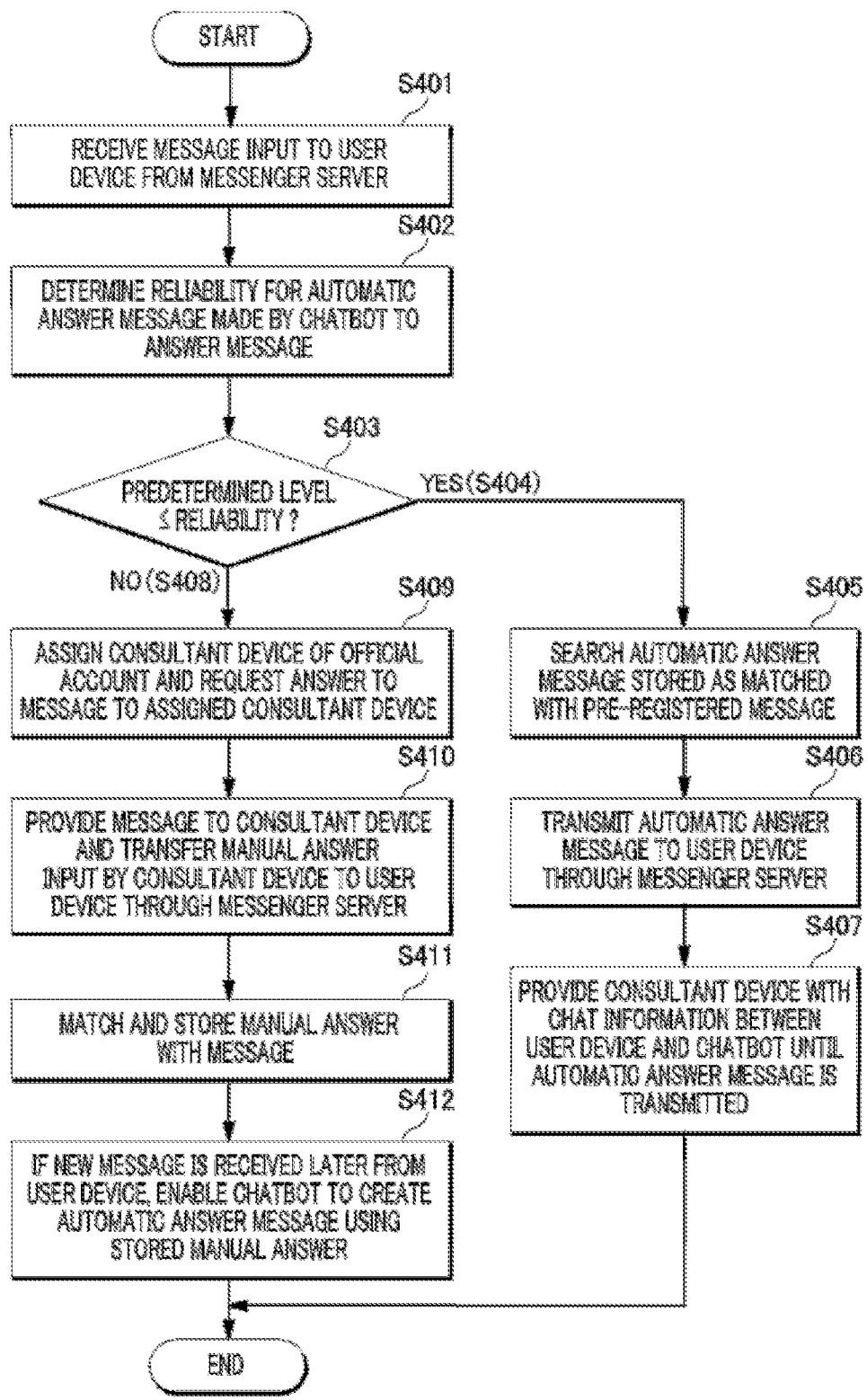
FIG. 4 is a flowchart illustrating an example processing flow for providing semi-automatic communication by a server based on the reliability of an automatic answer message of a chatbot in accordance with various embodiments described herein.

FIG. 4 is a flowchart illustrating an example processing flow for providing semi-automatic communication by a semi-automatic communication providing server based on the reliability of an automatic answer message of a chatbot in accordance with an embodiment of the present disclosure. The semi-automatic communication providing server 130 may include the chatbot server 131 and the consultant link server 132 of an official account.

Referring to FIG. 4, the semi-automatic communication providing server 130 may receive a message input by the user device 110 through the messenger server 120 (S401).

The semi-automatic communication providing server 130 may determine the reliability for an automatic answer message made by the chatbot to answer the message of the user device 110 through the chatbot server 131 (S402). Herein, the reliability may be calculated based on the result of analysis for the message of the user device 110.

The semi-automatic communication providing server 130 may determine whether or not the reliability of the automatic answer message of the chatbot is higher than a predetermined level through the chatbot server 131 (S403).

For example, if the reliability of the automatic answer message of the chatbot is higher than the predetermined level (S404), the chatbot server 131 may search an automatic answer message stored as matched with a pre-registered message (S405) and transmit the automatic answer message to the user device 110 through the messenger server 120 (S406). Herein, the semi-automatic communication providing server 130 may enable information about chats between the user device 110 and the chatbot until the automatic answer message is transmitted to be provided to the consultant device 140 through the consultant link server 132 of the official account (S407).

For another example, if the reliability of the automatic answer message of the chatbot is lower than the predetermined level (S408), the semi-automatic communication providing server 130 may assign a consultant device of the official account through the consultant link server 132 of the official account and request an answer to the message of the user device 110 to the assigned consultant device 140 (S409), and may provide the message of the user device 110 to the consultant device 140 and transfer a manual answer input by the consultant device 140 to the user device 110 through the messenger server 120 (S410).

Herein, the chatbot server 131 of the semi-automatic communication providing server 130 may match and store the manual answer of the consultant device 140 with the message of the user device 110 (S411), and if the chatbot server 131 receives later a new message input by the user device 110 through the messenger server 120, the chatbot server 131 may enable the chatbot to create an automatic answer message using the matched and stored manual answer of the consultant device 140 (S412).

In the descriptions above, the processes S401 to S412 may be divided into additional processes or combined into fewer processes depending on an embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for providing semi-automatic communication using a chatbot and a consultant device, comprising:
receiving, from a messenger server, a message input to an instant messaging application of a user device;
calculating a reliability for an automatic answer message for the user device made by the chatbot to answer the message;
transmitting the automatic answer message to the user device through the messenger server if the reliability is calculated to be higher than a predetermined level,
wherein the transmitting includes searching for an automatic answer message stored as matched with a pre-registered message;
providing the consultant device with information about chats between the user device and the chatbot before the automatic answer message was transmitted; and
transmitting a request to the consultant device to provide a manual answer to the message if the reliability is calculated to be lower than the predetermined level,
wherein the reliability is calculated based on a result of analysis for the message.

2. The method of claim 1, wherein the reliability is calculated based on a concordance rate between a text of the pre-registered message and a text of the message.

3. The method of claim 1,
wherein if the reliability is calculated to be higher than the predetermined level, the automatic answer message provided to the user device includes an identification mark indicating that the automatic answer message has been created by the chatbot, and
if the reliability is calculated to be lower than the predetermined level, the manual answer provided to the user device by the consultant device includes an identification mark indicating that the manual answer has been created by the consultant device.

4. The method of claim 1, wherein if the reliability is calculated to be lower than the predetermined level, the enabling of the consultant device to transmit the manual answer includes:
providing the message to the consultant device; and
transferring the manual answer input by the consultant device to the user device.

5. The method of claim 4, further comprising:
matching and storing the message with the manual answer.

6. The method of claim 5, further comprising:
enabling the chatbot to create an automatic answer message using the stored manual answer if a new message is received later from the user device.

7. The method of claim 6, wherein the enabling of the chatbot to create the automatic answer message includes performing machine learning with the matched and stored message and manual answer to increase the number of messages to which the chatbot is capable of creating an automatic answer message.

8. The method of claim 1,
wherein if the user device is connected to the consultant device, the enabling of the consultant device to transmit the manual answer includes:
maintaining a chat session between the user device and the consultant device until a consulting end message is received from the consultant device.

9. The method of claim 8, wherein after the consulting end message is received from the consultant device, the method further comprises:
terminating the chat session; and
re-determining the reliability for an automatic answer message made by the chatbot to answer a later message of the user device.

10. The method of claim 1, wherein the automatic answer message and the manual answer transmitted to the user device are shown on a same chat room of the instant messaging application.

11. The method of claim 1, further comprising:
if a request for a direct chat with the consultant device is received from the user device, forwarding the message input by the user device to the consultant device.

12. The method of claim 1, further comprising:
if a feedback indicating a low satisfaction with the automatic answer message is received from the user device, sending a request for an answer to the consultant device and performing machine learning with chats between the consultant device and the user device.

13. The method of claim 12, wherein, through the machine learning, multiple automatic answer messages are matched and stored with each pre-registered message and chat context weight is designated to each automatic answer message to provide different automatic answer messages for a same message depending on a chat context.

14. The method of claim 12, wherein the chat context with the user device includes two or more pairs of the message and the automatic answer message.

15. The method of claim 1, wherein if the message includes two or more consecutive messages, in the determining of the reliability, the two or more consecutive messages are combined to determine an intent and the reliability is calculated by comparing the intent with the pre-registered message.

16. The method of claim 1, wherein when the reliability is calculated to be lower than the predetermined level, the enabling of the consultant device to transmit the manual answer includes:
making a request for an answer to the message to a consultant server; and
transferring the request to the consultant device by the consultant server to transmit the answer to the user device through the consultant device.

17. A semi-automatic communication providing server using a chatbot and a consultant device, comprising:
a message receiving unit that receives, from a messenger server, a message input to an instant messaging application of a user device;
a reliability determination unit that calculates a reliability for an automatic answer message made by the chatbot to answer the message; and
an answer providing unit configured to:
search for an automatic answer message stored as matched with a pre-registered message,
transmit the automatic answer message to the user device through the messenger server if the reliability is calculated to be higher than a predetermined level,
provide a consultant device with information about chats between the user device and the chatbot before the automatic answer was transmitted, and
enable the consultant device to transmit a manual answer to the message if the reliability is calculated to be lower than the predetermined level,
wherein the reliability is calculated based on a result of analysis for the message.

18. A non-transitory computer-readable storage medium that stores computer program to execute a method as claimed in claim 1.

\* \* \* \* \*